June 11, 1957 C. K. HOOPER 2,795,782
MOVING TARGET RADAR COMPENSATOR
Filed May 15, 1950 2 Sheets-Sheet 1

WITNESSES:

INVENTOR
Charles K. Hooper.
BY
ATTORNEY

United States Patent Office 2,795,782
Patented June 11, 1957

2,795,782

MOVING TARGET RADAR COMPENSATOR

Charles K. Hooper, Linthicum Heights, Md., assignor to Westinghouse Electric Corporation, East Pittsburgh, Pa., a corporation of Pennsylvania Application May 15, 1950, Serial No. 162,041

10 Claims. (Cl. 343—7.7)

The present invention relates generally to radio distance and direction measuring or radar systems, of the types which eliminate indications due to stationary targets, and indicate the directions and ranges of moving targets only, and more particularly to systems of this character in which the effects of motions of the measuring system antenna, per se, are eliminated.

The object of moving target indication (MTI) systems of measuring distances and range targets by measuring and indicating the elapsed time between transmissions of pulses and reception of those pulses after reflection from the targets, is to eliminate from the indicator the positions, or ranges and directions, of all stationary targets, and to provide indications of the positions of moving targets only. To the extent that this is possible the positions of moving vehicles can be determined and indicated when they are located adjacent a reflecting stationary background, so that, in military applications, moving tanks may be distinguished from ground return, and hence may be detected by means of radar from an aircraft, or so that aircraft flying close to land masses may be detected despite the large echo returns from the latter, or so that moving ships or aircraft may be detected in the presence of sea-clutter and storm echoes.

The problem of providing MTI indications at stationary points has been solved in a number of ways in the prior art. The problem of providing MTI indications at a point which is itself moving relative to the target is complicated by that motion, since in all cases it is relative motion between a point of measurement and a target, to which the MTI system is responsive, and not alone the motion of the target. When the MTI system is on a vehicle, such as a ship, which is subject to roll, pitch and forward motion, it becomes desirable to eliminate from the MTI system effects due to these latter motions.

A further complication may arise from the fact the antenna of the radar system on a ship may be rotated about an axis which is nominally vertical, but which departs from the vertical due to roll and pitch of the ship. In all such systems, it will be clear that only components of antenna motion directed toward or away from targets are of interest, and that only components of target motion toward or away from the antenna are of interest.

It is accordingly a broad object of the present invention to provide a moving target indication radar system in which movement of the system relative to the target is compensated.

It is a further broad object of the invention to provide a moving target indication radar system in which compensation is effected for motions of the antenna of the system.

It is another object of the invention to provide a moving target indication radar system mounted on a moving vehicle which is subject to translatory motion, and to motions of roll and pitch, in which compensation for all the latter motions is introduced into the system.

It is still another object of the invention to provide a moving target indication radar system having a rotating antenna mounted on a vessel subject to pitch, roll and forward motion, in which compensation for all motions of the antenna relative to targets is compensated, whereby indications are provided only in response to moving targets and not to relative motions of the targets and the antenna.

The above and still further subjects, features and advantages of the present system will become apparent upon consideration of the following detailed description of a specific embodiment thereof, especially when taken in conjunction with the accompanying drawings, wherein.

Figure 3:
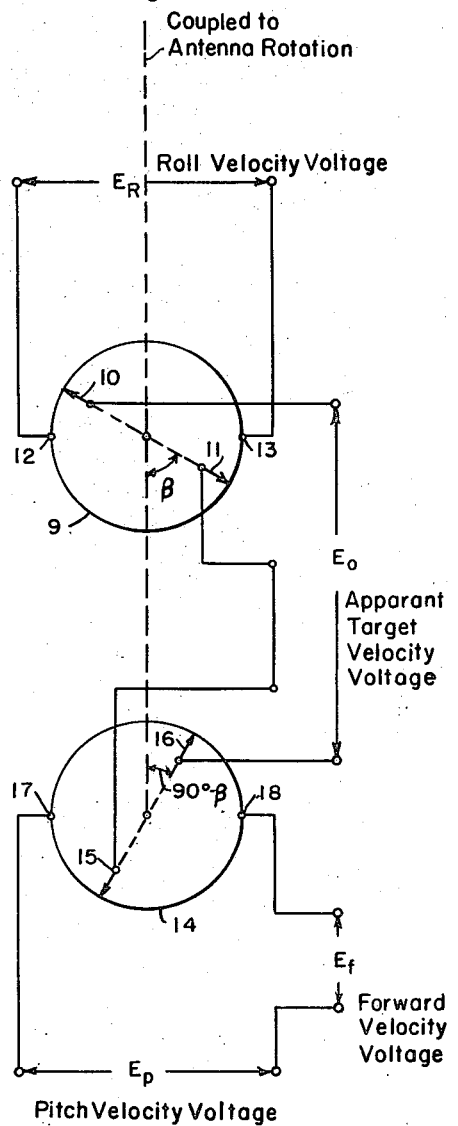
Figure 4:
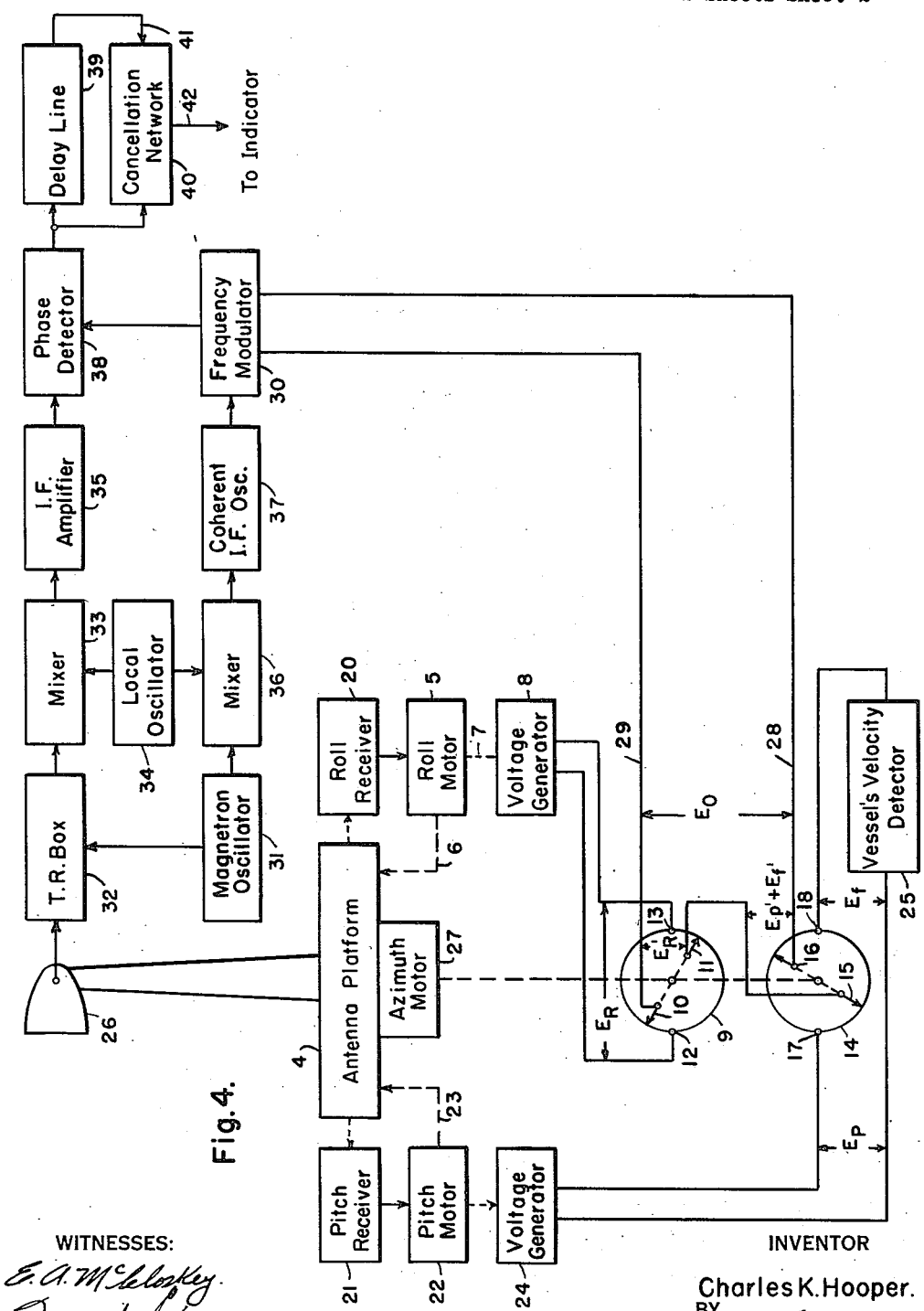

Figure 3 is a schematic circuit diagram of an electrical system for combining vectorially voltages corresponding with velocity components of the antenna due to roll and pitch of the vessel, forward motion of the vessel, and azimuthal scanning of the antenna; and, Figure 4 illustrates, largely in functional block diagram, the organization of a complete MTI radar system in accordance with the invention.

The transmitting portion of an MTI radar normally is identical with that in the more conventional system, or at least operates on analogous principles. The receiver of the system, however, utilizes the Doppler effect in one form or another, i. e., use is made of the difference in frequency which occurs in wave energy when transmitted from a moving source or reflected from a moving object. In the latter case the echo frequency is given by the Doppler formula, $$(1) \qquad f^1 = \frac{c+v}{c-v} f$$

where $f^1$ is the echo frequency, $f$ the originally transmitted frequency, $c$ the velocity of electromagnetic wave energy in free space and $v$ the velocity of the moving object toward the source of waves.

The beat frequency is then, $$(2) \qquad fd = f^1 - f = \frac{2v}{c-v} f$$

Since $v$ is small in comparison with $c$ this can be written $$(3) \qquad fd = \frac{2v}{c} f = \frac{2v}{\lambda}$$

where $$\lambda = \frac{c}{f}$$

For $v$ in miles per hour and $\lambda$ in centimeters this becomes $$(4) \qquad fd = \frac{89v}{\lambda}$$

If the transmissions take place as a series of discrete pulses, the beat between the transmitted and received pulses also is a series of discrete pulses, and these pulses have an amplitude envelope at the Doppler frequency $fd$.

The Doppler effect can be viewed as causing a phase shift of the echo from pulse to pulse, which is equivalent to the frequency shift. To demonstrate this it is merely necessary to note that the distance traveled by the target object between pulses is $vT$, where $T$ is the period between pulses. Therefore, each pulse travels a distance 2νT less than the preceding pulse, if the target object is approaching the pulse transmitter. This is $$\frac{2vT}{\lambda}$$

wave lengths, so that the total phase change in radians is (5) $\quad\dfrac{4\pi vT}{\lambda}$ between each pulse and the succeeding pulse, in the beat envelope. Stationary targets, by this reasoning, exhibit beat pulses of constant phase.

In the conventional MTI radar system a coherent oscillator is controlled by each transmitted pulse so that the oscillator continues to oscillate in locked phase and frequently with respect to the phase and frequency of the transmitted pulse, in the interval between pulses. The output of the coherent oscillator is then applied to the echo pulse receiver for comparison with the echo pulses, and beats are generated. These beats are of constant amplitude for steady targets and of varying amplitude for moving targets, the rate of modulation being proportional to the velocity of the target, in accordance with the mathematical relationships above expounded.

The signals derived from the receiver are applied to an indicator via a cancellation device which subtracts the pulses received during each range scan of the radar from the pulses received during the next succeeding scan, so that a pulse corresponding with any particular range is in continual process of cancellation. Those pulses which are of steady amplitude, and which correspond with stationary targets, are effectively removed by the cancellation process. Those pulses which are amplitude modulated are not effectively cancelled, since each pair of successive pulses from a single given target consists of two pulses of different amplitude. Accordingly, the latter pulses reach the indicator and provide visual indications of range.

To the extent that there is introduced into the output of the coherent oscillator a frequency or phase shift there is introduced at the receiver the same effect as is produced by a velocity component at the target. Accordingly, if the receiver system has a component of velocity relative to the target, that component of velocity may be compensated for by introducing proper frequency or phase variations of the output of the coherent oscillator. Such variations may be produced by a frequency modulator of conventional character, in response to a voltage, and it therefore becomes a basic requirement of the present invention to provide devices for generating the required voltage.

Figure 1:
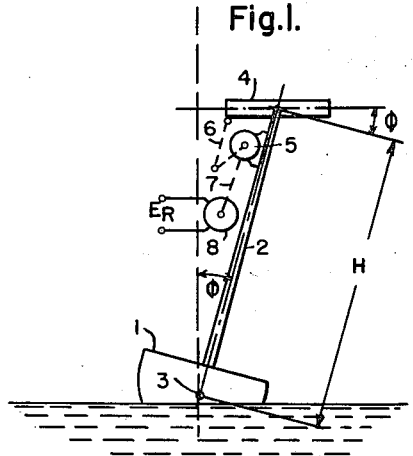
Figure 1 is a view in front elevation of a vessel having a stabilized antenna, and illustrating certain geometrical velocity relations, involved.

Referring now particularly to the accompanying drawings, Figure 1 illustrates in transverse section a vessel 1, having a normally vertical mast 2, which is illustrated as making an angle $\phi$ with the vertical, due to roll of the vessel 1. The mast 2 has a height H relative to the roll axis 3 of the vessel 1, to the point on the mast where is mounted a radar antenna platform 4.

Secured to the mast 2 is a stabilizing motor 5, which, in response to a conventional roll receiver (not illustrated) and via linkages 6 maintains the radar antenna platform 4 in a horizontal attitude, despite roll of the vessel 1, and with respect to the axis of roll. Coupled to the shaft of the stabilizing motor 5 by devices conventionally illustrated as coupling 7, which may comprise gearing, for example, is a D.-C. tachometer generator 8. The latter generates a D.-C. voltage $E_R$ which is proportional to its speed of rotation. In order that the stabilizing motor 5 shall maintain stabilization of the platform 4 its speed must at all times be equal to the angular velocity of roll. It follows that the voltage output of the D.-C. tachometer generator must similarly be proportional to the angular velocity of roll of the vessel 1.

We may write, therefore:

(6) $\quad E_R = KW_r$ where K is a proportionality constant, and $W_r$ is the instantaneous angular velocity of roll of the vessel 1 in radians per second, tangent to the arc of roll.

The linear velocity of the antenna tangent to the arc of roll is (7) $\quad V_r = HW_r$ and the horizontal component of this motion is (8) $\quad V_{rh} = V \cos \phi = HW_r \cos \phi$ For small values of the angle $\phi$ cos $\phi$ is substantially $=1$, wherefore (9) $\quad V_{rh} = HW_r$ (approximately)

(10) $\quad = H\dfrac{E_r}{K} = K_1 E_r \cdot \left(K_1 = \dfrac{H}{K}\right)$

The voltage output of the D.-C. tachometer generator 8 is, accordingly, approximately proportional to the horizontal component of velocity of the antenna, in the direction of roll of the vessel 1, and for usual roll angles the approximation is quite close.

By a precisely similar argument it may be deduced that, if the antenna 4 be stabilized in respect to pitch of the vessel 1 by means of a motor, which is mechanically coupled with a D.-C. tachometer, the latter will generate a D.-C. voltage approximately proportional to the horizontal component of velocity of the antenna 4, in the direction of pitch of the vessel 1.

If $V_{ph}$ is the horizontal component of motion of antenna 4 due to pitch, and $E_p$ the output of the D.-C. tachometer, it follows that

(11) $\quad V_{ph} = K_1 E_p$

Figure 2:
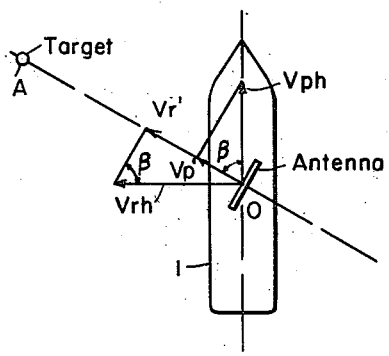
Figure 2 is a plan view of the vessel, illustrating a vector composition of velocities due to roll and pitch of the vessel, and antenna scanning in azimuth.

Referring now to Figure 2 of the accompanying drawings, the vessel 1 is illustrated in plan, an antenna being shown as rotating about an axis 0. The antenna and target A are taken to be instantaneously at an angle $\beta$ with respect to the vessel's fore and aft axis, or axis of roll.

The instantaneous roll velocity is shown, in Figure 2, as a vector $V_{rh}$ at right angles to the roll axis, and the instantaneous pitch velocity as a vector $V_{ph}$ coinciding with the roll axis. The components of antenna roll and pitch velocity in the direction of the target is then seen to be, respectively

(12) $\quad V_r^1 = V_{rh} \sin \beta$
$\quad\quad V_p^1 = V_{ph} \cos \beta$

The total velocity of the antenna toward the target, due to both roll and pitch is, then:

(13) $\quad V_o = V_r^1 + V_p^1 = V_{rh} \sin \beta + V_{ph} \cos \beta$
(14) $\quad = K_o[E_R \sin \beta + E_p \cos \beta]$ It is then necessary to provide means for combining $E_R$ and $E_p$ continuously, as $\beta$ varies, and in accordance with Equation 15. The combination may be effected by means of the network of Figure 3 of the accompanying drawings, wherein 9 is a slider type resistor arranged about a circular path, and provided with two diametrically opposed sliding contacts 10 and 11. Voltage $E_R$ is applied across diametrically opposite points 12 and 13 of the resistor 9, and the slider is driven in synchronism with the rotations of the antenna of the system, the angle $\beta$ between a vertical bisector of the line joining points 12, 13, and the line joining contacts 10, 11, as shown in Figure 3, coinciding with the angle $\beta$ which the antenna makes with the fore and aft axis of the vessel 1.

The resistance values of resistor 9 are so proportioned that:

(15) $\quad E_R^1 = E_R \sin \beta$

A similar slider type resistor 14 is provided, having sliding contacts 15 and 16, arrange on a diameter of the slider resistor 14, which is perpendicular to the line joining the sliding contacts 10 and 11. Contacts 15 and 16 are driven synchronously with contacts 10 and 11 and with the antenna. The voltage $E_p$ is applied to the diametral points 17, 18 of the slider type resistor 14, so that the line joining the contacts 15, 16 makes the angle $\beta$ with the line joining points 17, 18. The voltage available across the contacts 15, 16, is then

(16) $\quad E_p{}^1 = E_p \cos \beta$ if the voltage $E_p$ is applied to the points 17, 18. If then the voltages $E_R{}^1$ and $E_p{}^1$ are connected in series

(17) $\quad Eo = E_R{}^1 + E_p{}^1$
(18) $\quad\quad = K^1 o E_R \sin \beta + E_p \cos \beta$ The constant $K_o{}^1$ may be selected to provide a correct value of $Eo$ to indicate actual antenna velocity toward or from a target, as affected by pitch or roll.

Assume now that the forward motion of the vessel $V_F$ may be measured and translated into a voltage $E_F$, proportional thereto, since $V_F$ is collinear with $V_p$, the component of $V_F$ which is directed toward the target, $V_f{}^1$ is

(19) $\quad V_f{}^1 = V_f \cos \beta$

The total velocity of the antenna in the direction of the target is then

(20) $\quad V_T = V_r \sin \beta + V_p \cos \beta + V_f \cos \beta$
(21) $\quad\quad = V_r \sin \beta + (V_p + V_f) \cos B$ The voltage $E_f$ corresponding with the forward velocity of the vessel need only be connected in series with the voltage $V_p$ corresponding with the pitch velocity of the antenna, to effect the desired composition of voltages.

Reference is now made to Figure 4 of the accompanying drawings wherein is illustrated in functional block diagram the organization of a complete system in accordance with the present invention. More specifically there is illustrated the antenna platform 4, which may be mounted on a mast 2 (not illustrated in Figure 4) and which may be stabilized in respect to roll of the vessel 1 by means of a roll motor 5 mechanically coupled to the platform 4 in a fashion which is conventional per se, and which may be controlled in response to a roll receiver 20, which senses any deviation of the antenna platform 4 from a level condition in respect to the roll axis 3 of the vessel 1. There is similarly illustrated a pitch receiver 21, which in response to deviations of the antenna platform from a level condition in respect to pitch controls a pitch motor 22, which is mechanically coupled by elements conventionally illustrated by a dotted line 23, to the platform 4, for re-establishing such level condition. The roll receiver 20, the roll motor 5, the pitch receiver 21 and the pitch motor 22, and the necessary associated mechanical elements, required to enable these receivers and motors to perform their functions, are per se well known in the prior art, and accordingly are not illustrated in detail herein, nor further described. Reference is made, however, to U. S. Patent No. 2,426,658, issued to D. E. Wooldridge, on September 2, 1947, for a more detailed explanation and analysis of the structure and operation of stabilizing elements which may be utilized in the practice of the present invention. As has been explained hereinbefore, the D.-C. roll voltage generator 8, in response to actuation by the roll motor 5, generates a voltage $E_R$ which is applied across the points 12, 13 of the circular resistor 9, while the D.-C. pitch voltage generator 24 generates a voltage $E_p$ in response to rotation of the pitch motor 22, and that voltage is applied, is series with a further voltage $E_f$ derived from a device 25 in response to the forward velocity of the vessel on which the system is mounted, across the points 17, 18 of circular resistance 14.

The directive antenna 26 is mounted on the antenna platform 4, so that stabilization of the latter serves similarly to stabilize the antenna 26 in respect to both roll and pitch of the vessel on which the system is mounted. Additionally, the antenna 26 is rotated in azimuth by means of an azimuth motor 27. It is possible to rotate the resistor contacts 10, 11 and 15, 16 in synchronism with the antenna azimuth by means of electro-mechanical means such as synchroties or servo systems as well as by the direct mechanical means referred to hereinbefore.

There accordingly appears across the contacts 10, 11, the voltage $E_R{}^1$ corresponding with that component of velocity of the antenna 26 which is due to roll of the vessel in the direction of the target, or in the direction of the directional radiation pattern of the antenna 26. Similarly, there is developed across the contacts 15, 16 a voltage $E_p{}' + E_f{}'$, which is due to that component of the vessel's velocity in the direction of the radiation pattern of the antenna 26 which is due to pitch of the vessel, ($V_p{}'$) and to the vessel's forward velocity ($V_f{}'$). The voltages available across the contacts 10, 11 and 15, 16 respectively, are added by connecting the two sets of contacts in series, the resultant voltage $E_o$ appearing then across the leads 28, 29, and this voltage corresponding in magnitude, or proportional to, the velocity of the antenna 26 in the direction of its own radiation pattern due to roll and pitch of the vessel and to forward velocity of the vessel. The voltage $E_o$ is applied to a frequency modulator 30, for purposes which will become clear as the description proceeds.

The antenna 26 is caused to radiate pulses in response to energization thereof by a magnetron oscillator 31 via a T—R box 32, in a manner which is per se conventional in the art. The T—R box similarly is connected to a mixer 33, to which is thus applied received echo pulses caused by reflection of the transmitted pulses from remote objects or targets. To the mixer 33 is applied local oscillator signal from a local oscillator 34, of highly stable character, the output of the mixer 33 being thereby converted to a frequency suitable for amplification in intermediate frequency amplifier 35.

Each output pulse from the magnetron oscillator 31 is applied together with output from local oscillator 34, to a further mixer 36, the output of which controls or locks the phase of a coherent intermediate frequency oscillator 37, which is arranged to oscillate in precise phase relation with each transmitted pulse, for the interval between that pulse and the succeeding pulse. The frequency and phase of the coherent oscillator signals remain fixed, then with respect to the frequency and phase of returned echo pulses.

To review the reason for this, the phase of the echo signal, at intermediate frequency, from a stationary target, depends on the starting phase of the transmitter magnetron oscillator 31, the starting phase of the local oscillator 34, and the range of the target causing the echo signal, since that range determines the number of cycles executed by the local oscillator 34 while the transmitted pulse travels to the target and back. The intermediate reference signal provided by the coherent oscillator 37 has a phase that depends on the starting phases of the oscillator 31 and of the local oscillator 34, and on the range of the target, since the latter determines the number of cycles executed by the coherent oscillator 37 during the echo time. The starting phases of the transmitter 31 and the local oscillator 34 cancel out when the I. F. echo signal and the I. F. reference signal beat against each other in phase detector 38. Hence, the relative phase of the outputs of the oscillator 37 and I. F. amplifier 35 depends only on the number of cycles executed by the local oscillator 34 and by the coherent oscillator 37. Both of these oscillators are made extremely stable. Hence, the relative phase is such that the resulting beat signal would have a steady amplitude from pulse to pulse, for steady or stationary targets. When the target is moving, however, its range changes from pulse to pulse, and a fluctuating beat signal results from the corresponding change in the phases traversed by the oscillators during each echo-time.

The output of the coherent intermediate frequency oscillator 37 is, in the present system, applied to a frequency modulator 30, to which is also applied control voltage $E_o$, which varies the output frequency of the coherent intermediate frequency oscillator 37 in proportion to the magnitude of the voltage $E_o$, and in accordance with its algebraic sign.

By suitable choice of the electrical parameters of the system, the change in voltage introduced by the frequency modulator 30 in response to the voltage $E_o$ may be arranged to be precisely the Doppler frequency corresponding with the velocity of the antenna 26 in the direction of its radiation pattern due to roll, pitch and forward velocity of the antenna 26.

The output of the frequency modulator 30 and of the intermediate frequency amplifier 35 are applied to a phase detector 38, the output of which depends upon the relative phase of the signals applied thereto from the I. F. amplifier 35 and from the frequency modulator 30. When those outputs are steady in phase, from pulse to pulse, for a given target, all pulse outputs from the phase detector 38 for that target remain of the same amplitude. For relatively varying phase, on the other hand, a progressive change in phase of the envelope of the output of the phase detector 38 takes place, or a continual variation in amplitude, the frequency of the envelope corresponding with a Doppler frequency. Since the output of the frequency modulator 30 is so selected at each instant of time that the velocity of the antenna 26 in the direction of any target has been compensated for, any Doppler frequency which exists is that due solely to the velocity of the target itself in the direction of the directivity of the antenna 26.

The output of the phase detector 38 is applied to a delay line 39, having a period equal to the time elapse between successive pulses transmitted by the antenna 26, or to the time of each complete range scan. The output of the phase detector 38 is similarly applied to a cancellation network 40. The output of the delay line is also applied to the cancellation network 40 via a lead 41. The two inputs to the cancellation network 40 are caused to oppose each other in the cancellation network 40, so that if the pulse output from the phase detector 38 is of constant amplitude from pulse to pulse, for any given target, zero output will be provided from the cancellation network to the output lead 42, since each echo pulse from a given target arriving at the cancellation network via the delay line 39, arrives at the cancellation network 40 at the same time that a succeeding pulse is applied to the cancellation network 40 directly, and without the interposition of the delay line 39. If the pulses are always equal their resultant is zero. If, however, succeeding pulses are of different amplitude, as is true when the pulses are derived from a moving target, complete cancellation is not effected in the cancellation network and accordingly signal output is available on the lead 42. The latter is applied to a conventional radar indicator, such as an A-scope, a P. P. I. indicator, or the like, and there utilized in conventional fashion to provide a range or range versus bearing presentation.

While I have described and illustrated one particular mode of developing voltages representative of antenna velocity components due to vessel roll and pitch as well as forward motion, variations of the specific mode herein disclosed will suggest themselves to those skilled in the art. In particular, in the event that the pitch and roll stabilizing motors are both shunt-wound or permanent magnet D.-C. motors their counter E. M. F. will be proportional to roll and pitch velocities. Since the applied D.-C. voltage to such motors is approximately equal to the counter E. M. F. thereof, the applied voltage may be used as indicative of velocity, in lieu of the D.-C. generators 8, 23 of the present disclosure. Additionally, the antenna of the system may not be stabilized. In such case angular velocities of the antenna due to roll and pitch may be derived from a stable vertical element when provided on the vessel carrying the antenna.

Although, I have described the velocity indicative generators as being D.-C. generators, it is understood that A.-C. generators may be used. If A.-C. generators are used their outputs should be rectified before they are combined in the resistance networks.

I have further illustrated my invention as applied to a particular MTI radar system, chosen as exemplary. A large number of variations of that system are well known in the art, each of which employs, however, a coherent oscillator, for the same purpose as in the exemplary system. It will be clear that the present invention may be applied to any of these MTI radar systems, as desired.

I claim as my invention:

1. In combination, in a moving target indication distance measuring system mounted on a vehicle subject to roll and pitch, a transmit-receive antenna, a stabilizing platform for said antenna, means comprising a first voltage generator for generating a first voltage substantially proportional to the velocity of roll of said platform, means comprising a second voltage generator for generating a second voltage substantially proportional to the velocity of pitch of said platform, means for combining said first and second voltages to provide a third voltage representative of the velocity of said platform due to both said roll and said pitch, means coupled to said antenna for transmitting wave energy pulses, means coupled to said antenna for receiving said wave energy pulses after reflection from a remote object, means for deriving from said transmitted pulses further wave energy coherent in phase and frequency with said transmitted pulses, means for varying the phase of said further wave energy in response to said third voltage to provide phase shifted coherent wave energy, and means for comparing the phase of said phase shifted coherent wave energy with the phase of said wave energy pulses after reflection from said remote object.

2. In a moving target distance measuring system a transmit-receive antenna rotatable in azimuth, a stabilizing platform for maintaining said transmit-receive antenna level during roll and pitch of a vehicle carrying said system, means comprising a first voltage generator for generating a first voltage substantially proportional to the velocity of roll of said platform in any predetermined azimuthal direction, means comprising a second voltage generator for generating a second voltage substantially proportional to the velocity of pitch of said platform in said predetermined azimuthal direction, means for combining said first and second voltages to provide a third voltage representative of the resultant velocity of said platform due to both said roll and said pitch in said predetermined azimuthal direction, means coupled to said antenna for transmitting wave energy pulses in said predetermined azimuthal direction, means coupled to said antenna for receiving said wave energy pulses after reflection from a remote object, means for generating wave energy coherent in phase and frequency with said transmitted wave energy pulses, means responsive to said third voltage for shifting the phase of said coherent wave energy in amount and sense corresponding with a Doppler phase shift of said transmitted wave energy due to said resultant velocity of said platform, and means for comparing the phase of the phase shifted coherent wave energy with the phase of the received wave energy pulses.

3. In a moving target distance measuring system for visually indicating the ranges and azimuthal bearings of remote targets, a directional transmit-receive antenna, means for rotating said antenna to vary the directivity of said antenna in azimuth, a stabilizing platform for maintaining said transmit-receive antenna level during roll and pitch of a vehicle carrying said antenna, means comprising a first voltage generator for generating a first voltage substantially proportional to the velocity of roll of said platform, means comprising a second generator for generating a second voltage substantially proportional to the velocity of pitch of said platform, means for varying said first voltage as a function of azimuthal directivity of said antenna to provide a first voltage wave, means for varying said second voltage as a function of azimuthal directivity of said antenna to provide a second voltage wave, means supplying wave energy pulses to said antenna for transmission thereby, means coupled to said antenna for receiving said wave energy pulses after reflection from a remote object, means for generating wave energy coherent with the transmitted wave energy, means for comparing the relative phases of said coherent wave energy and the received wave energy pulses, and means for varying the relative phases of said coherent wave energy and the received wave energy pulses in response to said first and second voltage waves.

4. In a system for measuring from a moving station subject to roll and pitch motions, the range and bearing of moving targets only by transmitting to said targets first wave energy pulses and receiving from said targets returned wave energy pulses, said system comprising a directional antenna for radiating said first pulses and intercepting said returned pulses, said antenna subject to a plurality of simultaneous components of velocity relative to each of said targets, the combination comprising, means for generating a plurality of voltages corresponding respectively to said roll and pitch motions and to said components of velocity, means for additively combining said voltages to provide a voltage wave corresponding to instantaneous antenna velocity, phase responsive means responsive to the relative phase of said first and returned pulses to determine relative movement of said antenna and said targets, and a control circuit connected to said voltage combining means so as to be responsive to said voltage wave and connected to said phase responsive means so as to control operation of said phase responsive means to render said phase responsive means responsive only to motion of said targets.

5. In a system for measuring from a moving station subject to motions of roll and pitch, the ranges and bearings of moving targets to the exclusion of stationary targets, by transmitting to said moving targets pulses of wave energy, receiving said wave energy as echo pulses after return from said targets, and indicating the ranges and bearings of those targets only for which no Doppler frequency exists between transmitted pulses and returned echoes, means for eliminating Doppler frequencies due solely to motions of said station comprising a source of wave energy coherent with said pulses of wave energy transmitted to said moving targets, means for generating in response to the velocity of motion of said moving station in the direction of each of said targets a control voltage proportional to said velocity, and means responsive to said control voltage for varying the frequency of said wave energy coherent with said pulses of wave energy transmitted to said moving targets to add thereto a Doppler frequency equal to said velocity of motion of said moving station.

6. In a system for measuring, by means including an antenna having a directive radiation pattern, and which is subject to motions of roll and pitch, the ranges and bearings of moving targets to the exclusion of stationary targets, by transmitting to said moving targets pulses of wave energy, receiving said wave energy as echo pulses after return from said targets, and indicating the ranges and bearings of those targets only for which no Doppler frequency exists between transmitted pulses and returned echoes, the combination comprising, means for generating supplementary wave energy coherent with said pulses of wave energy, means for generating a voltage proportional to velocity of roll of said antenna, means for generating a voltage proportional to velocity of pitch of said antenna; means for deriving from said voltages a control voltage proportional to velocity of motion of said antenna in the direction of its directive radiation pattern, means responsive to said control voltage for modifying the frequency of said supplementary wave energy by adding thereto a Doppler frequency representative of said velocity of motion of said antenna, and means for comparing the modified supplementary wave energy with said echo pulses to determine the presence of a Doppler frequency therebetween.

7. In a system for measuring, by means including a rotating antenna having a directive radiation pattern, and which is subject to motions of roll and pitch, the ranges and bearings of moving targets, by transmitting to said moving targets pulses of wave energy, receiving said wave energy as echo pulses after return from said targets, and indicating the ranges and bearings of those targets only for which no Doppler frequency exists between transmitted pulses and returned echoes, the combination comprising, means for generating supplementary wave energy coherent with said pulses of wave energy, means for generating a first voltage wave proportional for each azimuthal directivity of said radiation pattern to the velocity of roll of said antenna in the direction of said radiation pattern, means for generating a further voltage wave proportional for each azimuthal directivity of said radiation pattern to the velocity of pitch of said antenna in the direction of said radiation pattern, means for adding said first and further voltage waves to provide a control voltage wave proportional to the velocity of motion of said antenna, due to both roll and pitch, in the direction of said radiation pattern, means responsive to said control voltage wave for modifying the frequency of said supplementary wave energy by continuously adding thereto a Doppler frequency representative of said last mentioned velocity of motion of said antenna, and means for comparing the modified supplementary wave energy with said echo pulses to determine the presence of a Doppler frequency therebetween.

8. In a moving target range and bearing indicating system, the combination comprising, an antenna platform subject to roll and pitch, a roll receiver for detecting roll of said platform, a roll motor responsive to said roll receiver for stabilizing said antenna platform in respect to roll, a pitch receiver for detecting pitch of said platform, a pitch motor responsive to said pitch receiver for stabilizing said antenna platform in respect to pitch, a direct current roll generator, means for driving said direct current roll generator from said roll motor, whereby said direct current generator generates a direct control roll voltage proportional in magnitude to the speed of said roll motor and having a polarity corresponding with the direction of rotation of said roll motor, a direct control pitch generator, means for driving said direct control pitch generator from said pitch motor, whereby said direct control generator generates a pitch voltage proportional in magnitude to the speed of said pitch motor and having a polarity corresponding with the direction of rotation of said pitch motor, a directive antenna mounted on said platform, means for rotating said antenna to vary the directivity thereof in azimuth, means synchronized with rotation of said antenna in azimuth for deriving from said roll voltage a further roll voltage corresponding in magnitude and polarity with the component of roll velocity of said platform in the direction of directivity of said antenna, means synchronized with rotation of said antenna in azimuth for deriving from said pitch voltage a further pitch voltage corresponding in magnitude and polarity with the component of pitch velocity of said platform in said direction of directivity of said antenna, means for algebraically adding said further roll voltage and said further pitch voltage to provide a total voltage representative of the velocity of said platform in the direction of directivity of said antenna due to roll and pitch of said platform, a wave energy pulse transmitter coupled to said antenna, a coherent oscillator locked in phase and frequency to said wave energy pulses, means for varying the frequency of wave energy output of said coherent oscillator in response to said total voltage, receiving apparatus for receiving pulses transmitted by said antenna, and means for comparing the output of said receiving apparatus with the output of said coherent oscillator.

9. In a moving target range and bearing indicating system, a directional antenna subject to motions of roll and pitch, a roll receiver for detecting roll of said antenna, roll motor means responsive to said roll receiver for stabilizing said antenna in respect to roll, means responsive to said roll motor means for generating a direct-current roll voltage proportional in magnitude to the speed of said roll motor means and having a polarity corresponding with the direction of said roll, a pitch receiver for detecting pitch of said antenna, a pitch motor means responsive to said pitch receiver for stabilizing said antenna in respect to pitch, means responsive to said pitch motor for generating a direct-current pitch voltage proportional in magnitude to the speed of said pitch motor means and having a polarity corresponding with direction of said pitch, means for causing said directional antenna to scan in azimuth, means synchronized with said scanning for deriving from said direct-current roll voltage and said direct-current pitch voltage a total voltage representative of the velocity of said antenna in the direction of its directivity due to said roll and said pitch, a wave energy pulse transmitter coupled to said antenna, a coherent oscillator locked in phase and frequency to said wave energy pulses, means for continuously varying the frequency of the wave energy output of said coherent oscillator in response to said total voltage by a frequency increment corresponding with Doppler frequency of said velocity of said antenna due to said roll and said pitch, receiving apparatus responsive to the pulses transmitted by said antenna, and means for comparing the output of said receiving apparatus with the output of said coherent oscillator.

10. In a moving target range and bearing indication system having an antenna mounted on a mast of a vessel subject to roll and pitch, stabilizer means for maintaining said antenna level during said roll and pitch, means responsive to said stabilizer means for generating a direct-current voltage representative of the voltage of said antenna in any predetermined azimuthal direction due to said roll and pitch, a wave energy pulse transmitter coupled to said antenna, a coherent oscillator locked in phase and frequency to said wave energy pulses, means for continuously varying the frequency of the wave energy output of said coherent oscillator in response to said direct-current voltage by a frequency increment corresponding with the Doppler frequency of said velocity of said antenna, receiving apparatus for receiving pulses transmitted by said antenna and means for comparing the output of said receiving apparatus with the output of said coherent oscillator.

References Cited in the file of this patent

UNITED STATES PATENTS

| Number | Name | Date |
|---|---|---|
| 2,414,108 | Knowles | Jan. 14, 1947 |
| 2,417,086 | Proskauer | Mar. 11, 1947 |
| 2,495,591 | Meredith | Jan. 24, 1950 |
| 2,497,065 | Braddon | Feb. 14, 1950 |
| 2,501,479 | Sproule | Mar. 21, 1950 |
| 2,511,075 | Montrose-Oster | June 13, 1950 |
| 2,513,738 | Noxon | July 4, 1950 |
| 2,514,924 | Becker | July 11, 1950 |
| 2,515,248 | McCoy | July 18, 1950 |
| 2,530,828 | Leverenz | Nov. 21, 1950 |
| 2,543,448 | Emslie | Feb. 27, 1951 |
| 2,573,021 | Higinbotham | Oct. 30, 1951 |
| 2,678,440 | Watt | May 11, 1954 |